(12) United States Patent
Lee et al.

(10) Patent No.: US 12,015,727 B2
(45) Date of Patent: Jun. 18, 2024

(54) ELECTRONIC DEVICE INCLUDING REINFORCEMENT MEMBER

(71) Applicant: Samsung Electronics Co., Ltd., Suwon-si (KR)

(72) Inventors: Gunwoo Lee, Suwon-si (KR); Soogyu Lee, Suwon-si (KR); Sungsoo Jun, Suwon-si (KR); Ryounghun Kim, Suwon-si (KR); Sanghyeon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 76 days.

(21) Appl. No.: 17/533,601

(22) Filed: Nov. 23, 2021

(65) Prior Publication Data

US 2022/0174137 A1 Jun. 2, 2022

Related U.S. Application Data

(63) Continuation of application No. PCT/KR2021/016596, filed on Nov. 15, 2021.

(30) Foreign Application Priority Data

Nov. 30, 2020 (KR) .................. 10-2020-0164869
Mar. 11, 2021 (KR) .................. 10-2021-0031836

(51) Int. Cl.
   *H04M 1/02* (2006.01)
(52) U.S. Cl.
   CPC ....... *H04M 1/0249* (2013.01); *H04M 1/0262* (2013.01); *H04M 1/0277* (2013.01)
(58) Field of Classification Search
   CPC ............. H04M 1/0249; H04M 1/0262; H04M 1/0277; H04M 1/026; H04M 1/0202; H04M 1/02; H01Q 1/22; H01Q 1/24
   See application file for complete search history.

(56) References Cited

U.S. PATENT DOCUMENTS 6,280,202 B1 * 8/2001 Alden, III ............. H05K 7/142
                                                            439/573
10,177,803 B2    1/2019 Kim et al.
(Continued)

FOREIGN PATENT DOCUMENTS

CN   107359412   * 11/2017   ............... H01Q 1/44
JP   2015-136161 A   7/2015
(Continued)

OTHER PUBLICATIONS

International Search Report dated Mar. 3, 2022, issued in International Application No. PCT/KR2021/016596.
(Continued)

*Primary Examiner* — Angelica Perez
(74) *Attorney, Agent, or Firm* — Jefferson IP Law, LLP

(57) ABSTRACT

An electronic device is provided. The electronic device includes a housing including a first plate, a second plate, and a side member, a support member disposed in the space between the first plate and the second plate, a first conductive area included in the side member, a protruding area included in the first conductive area protruding from the first conductive area toward an interior of the housing, and electrically connected to the first conductive area, a first circuit board disposed on one surface of the support member, a reinforcement member protruding from the one surface of the support member toward the second direction, a second circuit board extending further than the first circuit board toward the protruding area, and disposed on the reinforcement member, and a connection member electrically connecting the protruding area and the second circuit board, and disposed on the second circuit board.

21 Claims, 14 Drawing Sheets

(56) References Cited

U.S. PATENT DOCUMENTS

| | | |
|---|---|---|
| 10,396,434 B2 | 8/2019 | Koo et al. |
| 10,665,926 B2 | 5/2020 | Kim et al. |
| 10,790,866 B2 | 9/2020 | Park et al. |
| 11,114,747 B2 | 9/2021 | Ham et al. |
| 11,184,980 B2 | 11/2021 | An et al. |
| 2002/0008963 A1* | 1/2002 | DiBene, II .............. H05K 3/368 361/720 |
| 2015/0062847 A1 | 3/2015 | Park |
| 2018/0019780 A1 | 1/2018 | Kim et al. |
| 2018/0096187 A1* | 4/2018 | Kwon .................... G06V 40/13 |
| 2018/0287246 A1* | 10/2018 | Kim ......................... H01Q 9/42 |
| 2019/0082536 A1* | 3/2019 | Park .................... H04M 1/0262 |
| 2020/0186180 A1 | 6/2020 | Park et al. |
| 2020/0259243 A1 | 8/2020 | Jeon et al. |
| 2020/0266562 A1 | 8/2020 | Park et al. |
| 2020/0267828 A1 | 8/2020 | Moon et al. |
| 2020/0267838 A1 | 8/2020 | An et al. |
| 2020/0267863 A1 | 8/2020 | Kim et al. |
| 2021/0041926 A1* | 2/2021 | Park ..................... H05K 9/0081 |
| 2022/0407218 A1* | 12/2022 | Guo ........................ H01Q 1/243 |

FOREIGN PATENT DOCUMENTS

| | | |
|---|---|---|
| KR | 10-2017-0037464 A | 4/2017 |
| KR | 10-2017-0087334 A | 7/2017 |
| KR | 10-2018-0007447 A | 1/2018 |
| KR | 10-2019-0141474 A | 12/2019 |
| KR | 10-2020-0101018 A | 8/2020 |
| KR | 10-2020-0101116 A | 8/2020 |
| KR | 10-2020-0101143 A | 8/2020 |
| WO | 2020/141692 A1 | 7/2020 |

OTHER PUBLICATIONS

Extended European Search Report dated Apr. 16, 2024, issued in European Application No. 21898456.5-1218.

\* cited by examiner

ELECTRONIC DEVICE INCLUDING REINFORCEMENT MEMBER

CROSS-REFERENCE TO RELATED APPLICATION(S)

This application is a continuation application, claiming priority under § 365(c), of an International application No. PCT/KR2021/016596, filed on Nov. 15, 2021, which is based on and claims the benefit of a Korean patent application number 10-2020-0164869, filed on Nov. 30, 2020, in the Korean Intellectual Property Office, and of a Korean patent application number 10-2021-0031836, filed on Mar. 11, 2021, in the Korean Intellectual Property Office, the disclosure of each of which is incorporated by reference herein in its entirety.

BACKGROUND

1. Field

The disclosure relates to an electronic device including a reinforcement member.

2. Description of Related Art

Due to development of mobile communication technologies, electronic devices including at least one antenna have been widely distributed. The electronic device may transmit and/or receive a radio frequency (RF) signal including a voice signal or data (e.g., a message, a picture, a video, a music file, or a game) by using an antenna for wireless communication.

An antenna of the electronic device may transmit and/or receive signals pertaining to different frequency bands by using the plurality of frequency bands. The electronic device may service a global communication band by using signals pertaining to different frequency bands. For example, the electronic device may perform communication (e.g., a global positioning system (GPS), Legacy, Wifi1) that uses signals pertaining to a low frequency band (LB), and/or communication (e.g., Wifi2) that uses signals pertaining to a high frequency band (HB).

The electronic device may transmit and/or receive signals by using a housing itself including a conductive material, as well as an antenna module disposed in an interior of the housing, as a radiator. For example, the electronic device may include a plurality of conductive areas disposed at least a portion of the housing to be used as an antenna radiator. The plurality of conductive areas may be electrically connected to a feeding part. The feeding part electrically connected to the plurality of conductive areas may transmit and/or receive signals pertaining to various frequency bands.

The electronic device may include nonconductive areas between the plurality of conductive areas. At least one printed circuit board may be disposed on a support member that is adjacent to the nonconductive areas. The printed circuit board may be electrically connected to the conductive areas used as antenna radiators. A printed circuit board and a connection member for connecting the printed circuit board and the conductive areas may be disposed on the support member coupled to the nonconductive areas. However, because a thickness of the support member is reduced to dispose the printed circuit board and the connection area in a limited space, it is difficult to secure a strength of the support member.

Embodiments of the disclosure provide an electronic device including a reinforcement member that may secure strength.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Additional aspects will be set forth in part in the description which follows and, in part, will be apparent from the description, or may be learned by practice of the presented embodiments.

In accordance with an aspect of the disclosure, an electronic device is provided. The electronic device includes a housing including a first plate that faces a first direction, a second plate that faces a second direction that is opposite to the first direction, and a side member that surrounds a space between the first plate and the second plate, a support member disposed in the space between the first plate and the second plate, a first conductive area included in the side member, a protruding area included in the first conductive area protruding from the first conductive area toward an interior of the housing, and electrically connected to the first conductive area, a first circuit board disposed on one surface of the support member, a reinforcement member protruding from the one surface of the support member in the second direction, a second circuit board extending further than the first circuit board toward the protruding area, and disposed on the reinforcement member, and a connection member electrically connecting the protruding area and the second circuit board, and disposed on the second circuit board.

In accordance with another aspect of the disclosure, an electronic device is provided. The electronic device includes a housing including a first plate that faces a first direction, a second plate that faces a second direction that is opposite to the first direction, and a side member that surrounds a space between the first plate and the second plate, a support member disposed in the space between the first plate and the second plate, a first conductive area included in the side member, a first circuit board disposed on one surface of the support member, a reinforcement member integrally formed with the support member, and protruding further than one surface of the support member in the second direction, and a second circuit board extending further than the first circuit board toward the first conductive area, and disposed on the reinforcement member.

According to various embodiments disclosed herein, the electronic device may secure strength by supporting the printed circuit board and the connection member by using the reinforcement member integrally formed with the support member.

Furthermore, according to embodiments disclosed herein, antenna performance may be prevented from being lowered by disposing the division areas between the plurality of conductive areas of the side member.

In addition, the disclosure may provide various effects that are directly or indirectly recognized.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
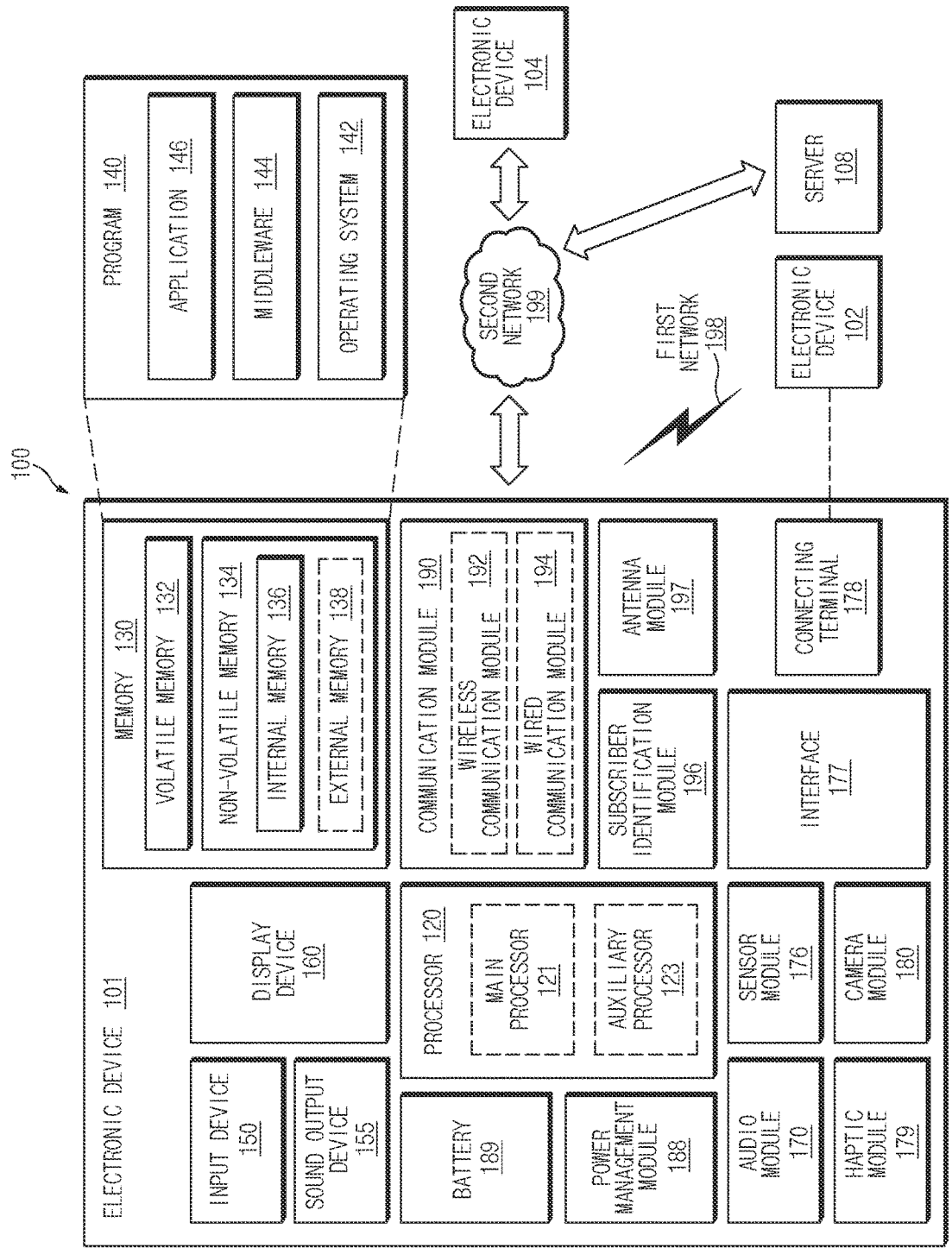
FIG. 1 is a block diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example. The electronic device 101 may provide ultra low-latency services using, e.g., distributed computing or mobile edge computing. In another embodiment, the external electronic device #04 may include an internet-of-things (IoT) device. The server 108 may be an intelligent server using machine learning and/or a neural network. According to an embodiment, the external electronic device #04 or the server 108 may be included in the second network 199. The electronic device #01 may be applied to intelligent services (e.g., smart home, smart city, smart car, or healthcare) based on 5G communication technology or IoT-related technology.

An electronic device according to various embodiments disclosed herein may include devices of various forms. The electronic devices, for example, may include a portable communication device (e.g., a smart phone), a computer device, a portable multimedia device, a portable medical device, a camera, a wearable device, or a home appliance. An electronic device according to various embodiments of the disclosure is not limited to the above-mentioned devices.

Figure 2:
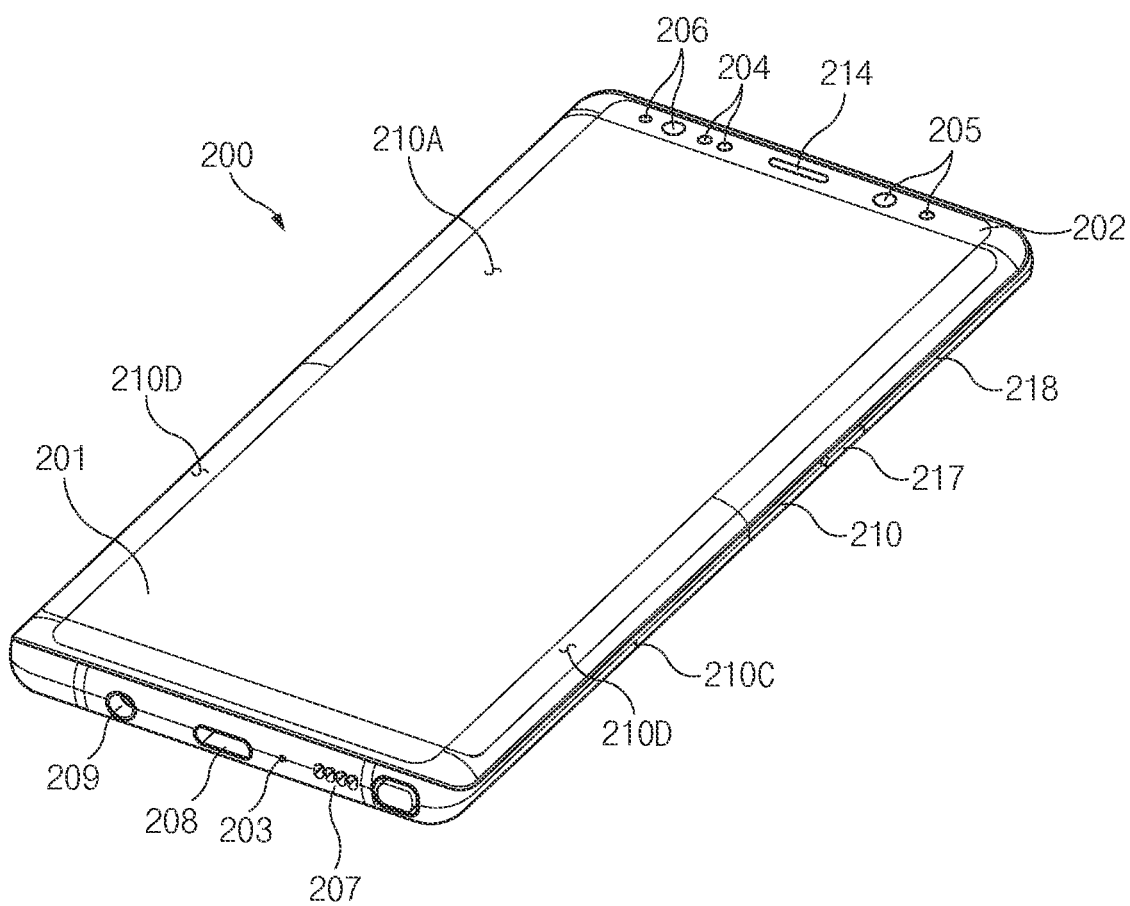
FIG. 2 illustrates a perspective view of a front surface of an electronic device according to an embodiment of the disclosure.

FIG. 2 is a perspective view of a front surface of an electronic device (e.g., the electronic device of FIG. 1) according to an embodiment of the disclosure.

Figure 3:
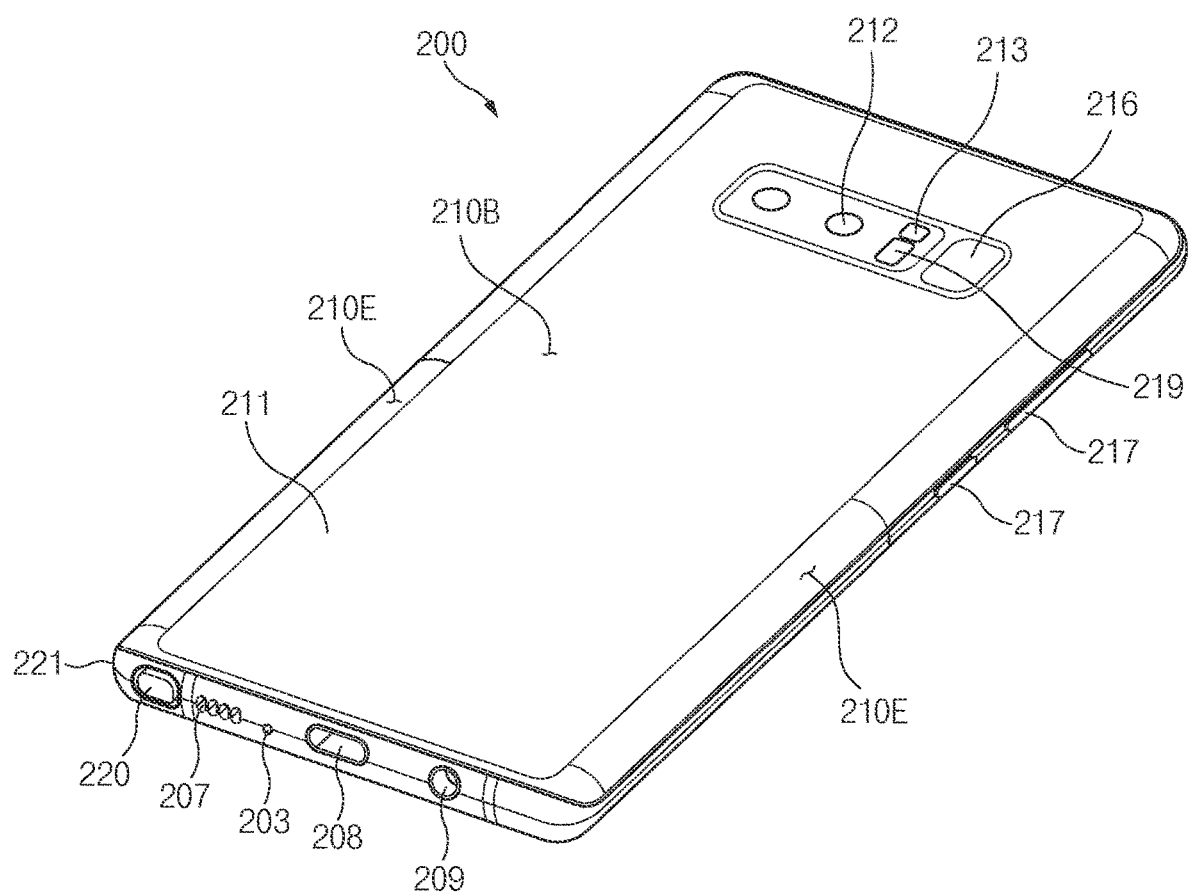
FIG. 3 illustrates a perspective view of a rear surface of an electronic device according to an embodiment of the disclosure.

FIG. 3 is a perspective view of a rear surface of the electronic device according to an embodiment of the disclosure.

Referring to FIGS. 2 and 3, the electronic device 200 may include a housing 210 including a first surface (or a front surface) 210A, a second surface (or a rear surface) 210B, and a side surface 210C that surrounds a space between the first surface 210A and the second surface 210B. In another embodiment of the disclosure (not illustrated), the housing may refer to a structure that defines some of the first surface 210A, the second surface 210B, and the side surface 210C of FIG. 2. The first surface 210A may be defined by a front plate 202 (e.g., a glass plate or a polymer plate including various coating layers), at least a portion of which is substantially transparent. The second surface 210B may be defined by a substantially opaque rear plate 211. The rear plate 211 may be formed of coated or colored glass, ceramics, a polymer, a metal (e.g., aluminum, stainless steel (STS), or magnesium), or a combination of at least two thereof. The side surface 210C may be coupled to the front plate 202 and the rear plate 211, and may be defined by a side bezel structure (or 'a side member') 218 including a metal and/or a polymer. In some embodiments, the rear plate 211 and the side bezel structure 218 may be integrally formed and may include the same material (e.g., a metallic material such as aluminum).

In the illustrated embodiment, the front plate 202 may include two first areas 210D that are deflected from the first surface 210A toward the rear plate 211 and extend seamlessly, at opposite ends of a long edge of the front plate 202. In the illustrated embodiment (see FIG. 3), the rear plate 211 may include two second areas 210E that are deflected from the second surface 210B toward the front plate 202 and extend seamlessly, at opposite ends of a long edge of the rear plate 211. In some embodiments, the front plate 202 (or the rear plate 211) may include only one of the first areas 210D (or the second areas 210E). In other embodiments, some of the first areas 210D or the second areas 210E may be omitted. In the embodiments, when viewed from a side of the electronic device 200, the side bezel structure 218 may have a first thickness (width) on a side surface, on which neither the first areas 210D nor the second areas 210E are included, and may have a second thickness that is smaller than the first thickness on a side surface, on which the first areas 210D or the second areas 210E are included.

At least one antenna radiator (e.g., a conductive pattern) may be disposed in the side member (e.g., the side bezel structure 218 of FIG. 3) of the housing 210 of the electronic device 200, the two first areas 210D deflected from the first surface 210A of the front plate 202 toward the rear plate 211 and extending seamlessly, or the two areas (e.g., the first area 210D and the second area 210E) deflected from the second surface 210B of the rear plate 211 toward the front plate 202 and extending seamlessly.

The first area 210D or the second area 210E may be planar to define substantially one plane with the first surface 210A or the second surface 210B without being deflected.

At least one antenna radiator may radiate a signal of a specific frequency band. At least one antenna radiator may be an auxiliary radiator. As another example, at least one antenna radiator may radiate a signal pertaining to a 5G Sub-6 frequency band of about 3.5 GHz to about 6 GHz, such as n41, n78, and/or n79. As another example, at least one antenna radiator may radiate a frequency of a Wi-Fi frequency band. The Wi-Fi frequency band may include a frequency band, such as 802.11a and/or 802.11b.

At least one antenna radiator may be a main radiator. Some of frequency bands radiated by the main radiator and some frequency bands radiated by the auxiliary radiator may be the same, and the remaining ones thereof may be different.

At least one antenna radiator may radiate a frequency of an mmWave frequency band. For example, the mmWave frequency band may include a frequency band, such as about 24 to 34 GHz and/or about 37 to 44 GHz. As another example, at least one antenna radiator may radiate a frequency of a frequency band of 11ay.

According to an embodiment of the disclosure, the electronic device 200 may include at least one of a display 201 (e.g., the display module 160 of FIG. 1), audio modules 203, 207, and 214 (e.g., the audio module 170 of FIG. 1), sensor modules 204, 216, and 219 (e.g., the sensor module 176 of FIG. 1), camera modules 205, 212, and 213 (e.g., the camera module 180 of FIG. 1), key input device 217, light emitting element 206, pen input device 220, and connector holes 208 and 209. At least one (e.g., the key input device 217 or the light emitting element 206) of the elements may be omitted from the electronic device 200 or another component may be additionally included in the electronic device 200.

The display 201 may be visually exposed through a corresponding portion of the front plate 202. In some embodiments, at least a portion of the display 201 may be exposed through the front plate 202 that defines the first surface 210A, and at least part of the first areas 210D and the second areas 210E of the side surface 210C. In some embodiments, corners of the display 201 may have a shape that is substantially the same as the adjacent outer shape of the front plate 202. In other embodiments (not illustrated), to expand the area, by which the display 201 is visually exposed, the intervals between the outskirts of the display 201 and the outskirts of the front plate 202 may be substantially the same.

In other embodiments (not illustrated), a portion of the screen display area of the display 201 may have a recess or an opening, and may include at least one of the audio module 214, the sensor module 204, the camera module 205, and the light emitting element 206, which are aligned with the recess or the opening. In other embodiments (not illustrated), at least one of the audio module 214, the sensor module 204, the camera module 205, the fingerprint sensor 216, and the light emitting element 206 may be included on the rear surface of the screen display area of the display 201. In other embodiments (not illustrated), the display 201 may be coupled to or be disposed to be adjacent to a touch detection circuit, a pressure sensor that may measure the strength (the pressure) of a touch, and/or a digitizer that detects a stylus pen of a magnetic field type. At least a portion of the sensor modules 204 and 219 and/or at least a portion of the key input device 217 may be disposed in the first areas 210D and/or the second areas 210E. In another example, a partial area of a screen display area of the display 201 may include another pixel structure, another pixel density, and/or another wiring structure as compared with another area, and may include at least one of the audio module 214, the sensor module 204, the camera module 205, and the light emitting element 206 disposed at a location that is aligned with the partial area.

The audio modules 203, 207, and 214 may include the microphone hole 203 and the speaker holes 207 and 214. A microphone for acquiring external sounds may be disposed in the microphone hole 203, and a plurality of microphones may be disposed to detect the direction of a sound. The speaker holes 207 and 214 may include the external speaker hole 207 and a receiver hole 214 for a call. In some embodiments, the speaker holes 207 and 214 and the microphone hole 203 may be implemented by one hole or a speaker may be included while the speaker hole 207 and 214 are not employed (e.g., a piezoelectric speaker).

The sensor modules 204, 216, and 219 may generate an electrical signal or a data value corresponding to an operational state of the interior of the electronic device 200 or an environmental state of the outside. The sensor modules 204, 216, and 219, for example, may include the first sensor module 204 (e.g., a proximity sensor) and/or the second sensor module (not illustrated) (e.g., a fingerprint sensor) disposed on the first surface 210A of the housing 210, and/or the third sensor module 219 (e.g., a HRM sensor) and/or the fourth sensor module 216 (e.g., a fingerprint sensor) disposed on the second surface 210B of the housing 210. The fingerprint sensor may be disposed not only on the first surface 210A (e.g., the display 201) but also on the second surface 210B of the housing 210. The electronic device 200 may further include a sensor module (not illustrated), for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or the illumination sensor 204.

The camera modules 205, 212, and 213 may include the first camera device 205 disposed on the first surface 210A of the electronic device 200, and the second camera device 212 and/or the flash 213 disposed on the second surface 210B. The camera modules 205 and 212 may include one or a plurality of lenses, an image sensor, and/or an image signal processor. The flash 213, for example, may include a light emitting diode (LED) or a xenon lamp. In some embodiments, two or more lenses (an infrared ray camera or a wide angle/telephoto lens), and image sensors may be disposed on one surface of the electronic device 200.

The key input device 217 may be disposed on the side surface 210C of the housing 210. In another embodiment, the electronic device 200 may not include some or all of the above-mentioned key input devices 217, and the key input devices 217, which are not included, may be implemented in different forms, such as a soft key, on the display 201. In some embodiments, the key input device may include the sensor module 216 disposed on the second surface 210B of the housing 210.

The light emitting element 206 may be disposed on the first surface 210A of the housing 210. The light emitting element 206 may provide state information on the electronic device 200 in the form of light. In other embodiments, the light emitting element 206 may provide a light source that interworks with an operation of the camera module 205. The light emitting element 206 may include an LED, an IR LED, and/or a xenon lamp.

The connector holes 208 and 209 may include the first connector hole 208 that may accommodate a connector (e.g., a USB connector) for transmitting and receiving electric power and/or data to and from an external electronic device and/or the second connector hole (e.g., an earphone jack) 209 that may accommodate a connector for transmitting and receiving an audio signal to and from the external device.

The pen input device 220 (e.g., a stylus pen) may be guided into the interior of the housing 210 through a hole 221 formed on the side surface of the housing 210 to be inserted or detached, and may include a button for easy attachment or detachment. The pen input device 220 may include an electromagnetic resonance (EMR) scheme, an active electrical stylus (AES), and/or an electric coupled resonance (ECR) scheme.

The electronic device 200 according to various embodiments of the disclosure may include an electronic device, such as a bar type, a foldable type, a rollable type, a sliding type, a wearable type, a tablet personal computer (PC), and/or a notebook PC. The electronic device 200 according to various embodiments of the disclosure is not limited to the above-described example, and may include other various electronic devices.

Figure 4:
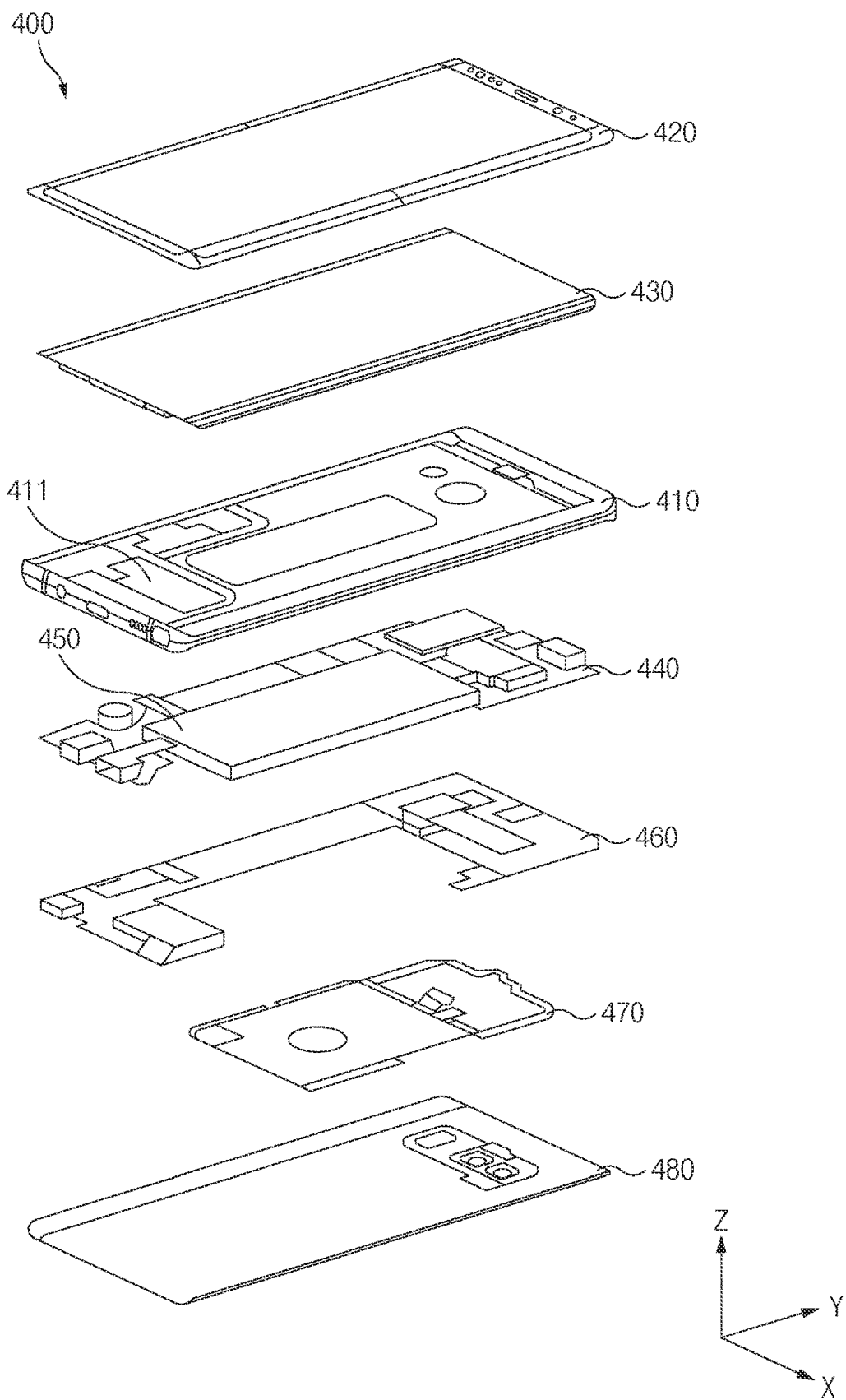
FIG. 4 illustrates an exploded perspective view of an electronic device according to an embodiment of the disclosure.

FIG. 4 is an exploded perspective view of an electronic device (e.g., the electronic device of FIG. 2 and/or FIG. 3) according to an embodiment of the disclosure.

Referring to FIG. 4, the electronic device 400 may include a side bezel structure 410 (e.g., the side bezel structure 218 of FIG. 2), a first support member 411 (e.g., the bracket), a front plate 420, a display 430 (e.g., the display 201 of FIG. 2), a PCB 440, a battery 450, a second support member 460 (e.g., the rear case), a short range antenna 470, and/or a rear plate 480 (e.g., the rear plate 211 of FIG. 3). In some embodiments, at least one (e.g., the first support member 411 or the second support member 460) of the elements may be omitted from the electronic device 400 or another component may be additionally included in the electronic device 200. At least one of the components of the electronic device 400 may be the same as or similar to at least one of the components of the electronic device 200 of FIG. 2 or 3, and a repeated description thereof will be omitted.

The side bezel structure 410 may include one or more conductive members that surround a space between the front plate 420 and the rear plate 480 of the electronic device 400 and are spaced apart from each other by a division part. For example, the side bezel structure 410 may include a plurality of conductive members that are spaced apart from each other by at least one division part. The electronic device 400 may include a structure that protrudes from at least one end and/or one point of the plurality of conductive members toward the interior of the housing (e.g., the housing 210 of FIG. 2). For example, the electronic device 400 may include at least one connector that protrudes from at least one end and/or one point of the plurality of conductive members toward the interior of the housing and is physically connected to a support member (e.g., the first support member 411). As another example, the electronic device 200 may include a protrusion that protrudes from at least one end of the plurality of conductive members toward the interior of the housing and is electrically connected to at least one of the plurality of conductive members.

The first support member 411 may be disposed in a space between the front plate 420 and the rear plate 480. The first support member 411 may be disposed in the interior of the electronic device 400 to be connected to the side bezel structure 410 or to be integrally formed with the side bezel structure 410. The first support member 411, for example, may be formed of a metallic material and/or a nonmetallic material (e.g., a polymer). In an embodiment, the display 430 may be disposed on a first surface (e.g., one surface that faces the +z axis direction) of the first support member 411, and the PCB 440 may be disposed on a second surface (e.g., one surface that faces the −z axis direction) that faces an opposite direction to the first surface.

A processor (e.g., the processor 120 of FIG. 1), a memory (e.g., the memory 130 of FIG. 1), an interface (e.g., the interface 177 of FIG. 1), an antenna module (not illustrated), and/or a wireless communication circuit (e.g., the wireless communication module 192 of FIG. 1) may be disposed in the PCB 440. The processor 120, for example, may include one or more of a central processing unit (CPU), an application processor (AP), a graphics processing unit (GPU), an image signal processor (ISP), a sensor hub processor (SHP), or a communication processor (CP). The memory, for example, may include a volatile and/or nonvolatile memory. The interface, for example, may include a high definition multimedia interface (HDMI), a universal serial bus (USB), an SD card interface, and/or an audio interface. The interface, for example, may electrically or physically connect the electronic device 400 to an external electronic device (e.g., the electronic device 102 and 104 of FIG. 1), and may include a USB connector, an SD card/multimedia card (MMC) connector, or an audio connector. The wireless communication circuit may be a radio frequency integrated circuit (RFIC). For example, the wireless communication circuit may feed an electrical signal to the protrusion formed at least a portion of the housing.

The antenna module may include at least one patch antenna. The antenna module may be configured to radiate a frequency of a specific frequency band (e.g., an mmWave frequency band). For example, the antenna module may be electrically connected to the wireless communication circuit mounted on the PCB 440. The antenna module may receive an electrical signal (e.g., a base band signal or an intermediate frequency (IF) signal) of a specific frequency band from the wireless communication circuit disposed in the PCB 440. The antenna module may amplify the electrical signal received by using at least one circuit (e.g., an RFIC), and may provide electric power to at least one radiator included in the antenna module.

The battery 450 is a device for supplying electric power to at least one component of the electronic device 200, and may include a primary battery that cannot be recharged, a secondary battery that may be recharged, or a fuel cell. At least a portion of the battery 450 may be disposed substantially in parallel to the PCB 440. The battery 450 may be integrally disposed in the interior of the electronic device 400, and may be disposed to be detachable from the electronic device 400.

The short range antenna 470 may be disposed between the rear plate 480 and the battery 450. The antenna 470 may include a near field communication (NFC) antenna, a wireless charging antenna, and/or a magnetic secure transmission (MST) antenna. The antenna 470 may perform short-range communication with an external device, or may wirelessly transmit and receive electric power that is necessary for charging. In another embodiment, an antenna structure may be formed by one or a combination of the side bezel structure 410 and/or the first support member 411. Hereinafter, various antenna structures of the electronic device will be described.

Figure 5:
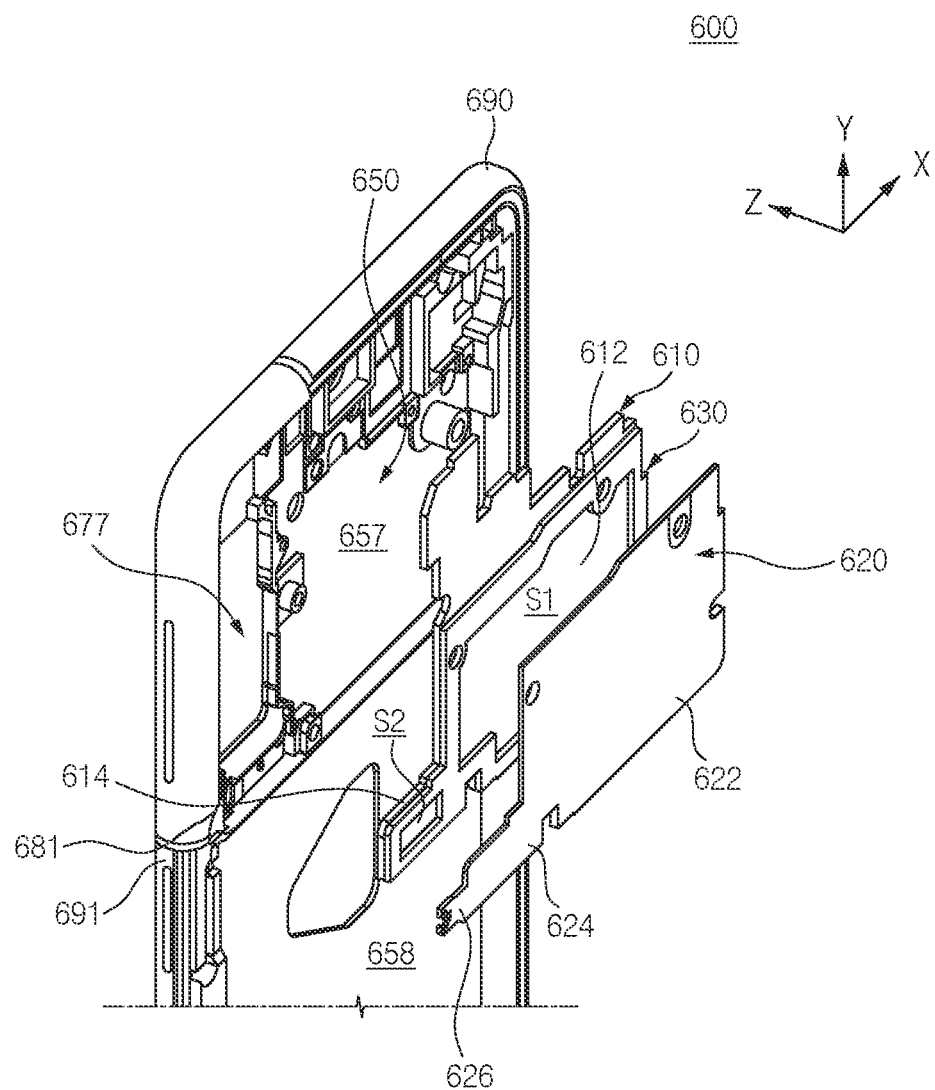
FIG. 5 is a view illustrating a side member and a support member included in an electronic device according to an embodiment of the disclosure.
Figure 6:
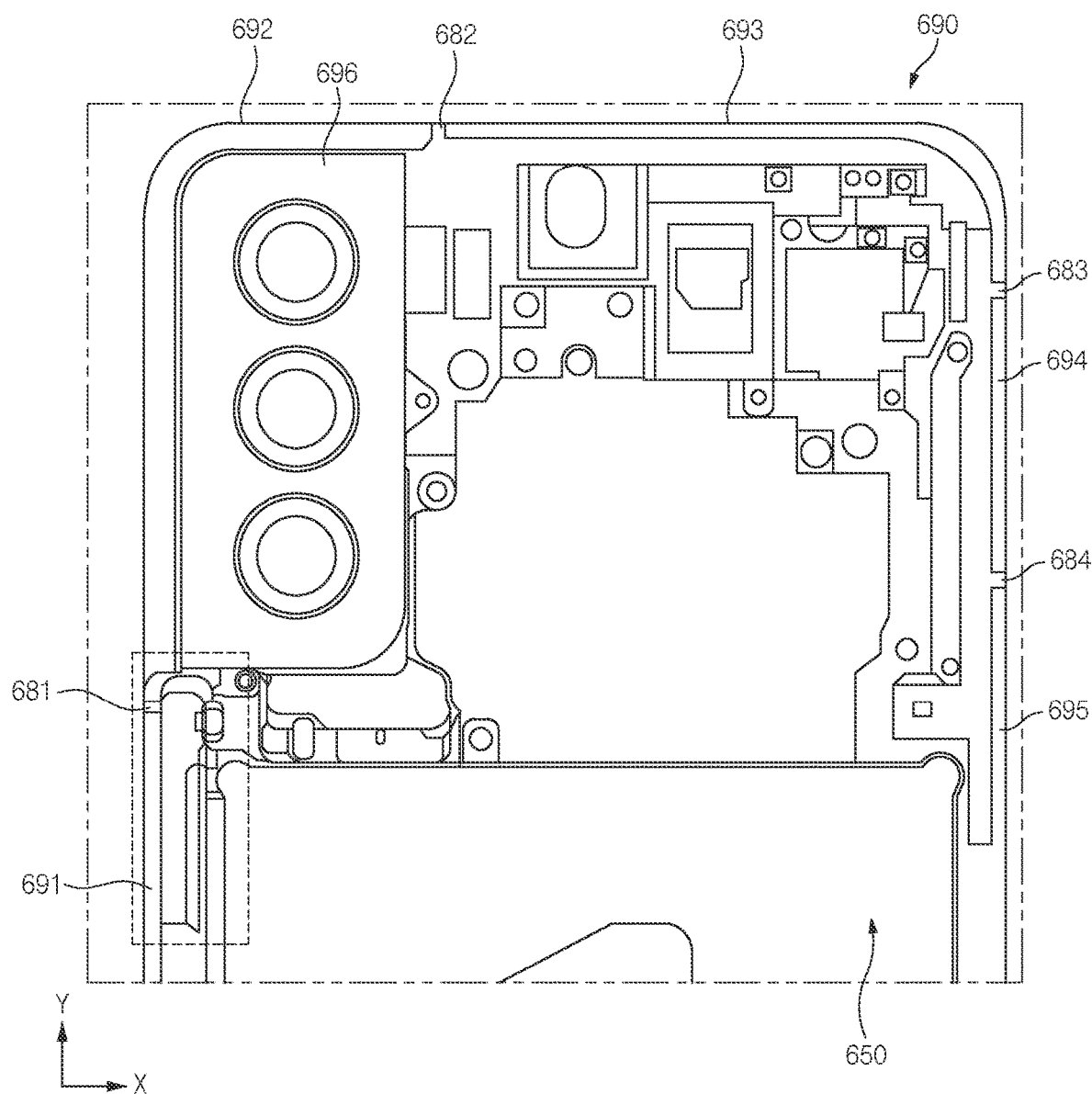
FIG. 6 is a view illustrating a connection relationship between a side member and a camera bracket of an electronic device according to an embodiment of the disclosure.

FIGS. 5 and 6 are views illustrating a side bezel structure included in an electronic device according to various embodiments of the disclosure.

Referring to FIGS. 5 and 6, an electronic device 600 according to an embodiment of the disclosure may include a side member 690, a support member 650 (e.g., the first support member 411 of FIG. 4) (or a bracket), a first circuit board (or a main board) 610, a second circuit board (or a slave board) 620, and an interposer 630.

The side member 690 (e.g., the side bezel structure 218 of FIG. 3) may correspond to at least a portion of the housing (e.g., the housing 210 of FIG. 2) that defines an external appearance of the electronic device 600. The side member 690 may include a plurality of conductive areas that are divided by at least one division area. For example, the side member 690 may include first to fifth conductive areas 691, 692, 693, 694, and 695 and first to fourth division areas 681, 682, 683, and 684. The first division area 681 may divide the first conductive area 691 and the second conductive area 692 therebetween, the second division area 682 may divide the second conductive area 692 and the third conductive area 693 therebetween, the third division area 683 may divide the third conductive area 693 and the fourth conductive area 694 therebetween, and the fourth division area 684 may divide the fourth conductive area 694 and the fifth conductive area 695 therebetween.

The conductive areas 691, 692, 693, 694, and 695 divided by the division areas 681, 682, 683, and 684 may be operated as individual antenna areas. The conductive areas 691, 692, 693, 694, and 695 may be divided to have a specific length to transmit or receive a signal of a specific frequency band. The division areas 681, 682, 683, and 684 may be filled with a material having an insulating property. For example, the division areas 681, 682, 683, and 684 may be filled with a polymer material formed through an injection-molding process. The division areas 681, 682, 683, and 684 may insulate the adjacent conductive areas 691, 692, 693, 694, and 695 used as antenna areas of different frequency bands, and may prevent foreign substances from penetrating from an outside of the housing as well.

According to an embodiment, at least one of the first to fifth conductive areas 691, 692, 693, 694, and 695 may be operated as an antenna area. For example, the first conductive area 691 and the third to fifth conductive areas 693, 694, and 695 may be operated as antenna areas, and the second conductive area 692 integrally formed with a camera bracket 696 cannot be operated as an antenna area.

At least one of the first conductive area 691 and the third to fifth conductive areas 693, 694, and 695 may be connected to a feeding unit to be used as an antenna. For example, the first conductive area 691 may be connected to the feeding unit to be used as an antenna.

The support member 650 may be disposed in the interior of the electronic device 600 to be connected to the side member 690 or to be integrally formed with the side member 690. The support member 650 may be formed of the same metallic material as that of the side member 690 or a metallic material that is different that of the side member 690.

The support member 650 may be disposed in a space between the first plate (e.g., the front plate 420 of FIG. 4) and the second plate (e.g., the rear plate 480 of FIG. 4). The display may be disposed on one surface (e.g., a surface that faces the +Z direction) of the support member 650, and the first circuit board 610 and the second circuit board 620 may be disposed on an opposite surface (e.g., a surface that faces the −Z direction) of the support member.

The first circuit board 610 may be disposed on a front surface (e.g., a surface that faces the +Z direction) of the interposer 630, and the second circuit board 620 may be disposed on a rear surface (e.g., a surface that faces the −Z direction) of the interposer 630.

Components of the electronic device may be disposed in the first circuit board 610 and the second circuit board 620. Various electronic components, such as a processor, a memory, an antenna module, and a wireless communication circuit, may be disposed in at least any one of the first circuit board 610 and the second circuit board 620. For example, components of the electronic device may be disposed on at least any one of a rear surface (e.g., a surface that faces the −Z direction) of the first circuit board 610, a front surface (e.g., a surface that faces the +Z direction) of the second circuit board 620, and a rear surface (e.g., a surface that faces the −Z direction) of the second circuit board 620. The components of the electronic device may be disposed in at least one interior space S1 and S2 defined by the first circuit board 610 and the second circuit board 620.

The interposer 630 may electrically connect the first circuit board 610 and the second circuit board 620. For example, a signal generated by an electronic component disposed in any one of the first circuit board 610 and the second circuit board 620 may be delivered to an electronic component disposed in the remaining one of the first circuit board 610 and the second circuit board 620 through the interposer 630.

According to an embodiment, the first circuit board 610 may include a first main area 612 and a second main area 614. Front surfaces (e.g., surfaces that face the +Z direction) of the first main area 612 and the second main area 614 may be disposed in a first space 657 of the support member 650. Rear surfaces (e.g., surfaces that face the −Z direction) of the first main area 612 and the second main area 614 may contact the interposer 630. The first main area 612 and the second main area 614 may have the same size or different sizes. For example, the second main area 614 may have a size that is smaller than that of the first main area 612. The second main area 614 may extend from the first main area 612 in a direction (e.g., the −X direction) that faces the first conductive area 691. A second space 658 may be arranged to support various components.

The second circuit board 620 may include a first slave area 622, a second slave area 624, and a third slave area 626. Portions of front surfaces (e.g., surfaces that face the +Z direction) of the first slave area 622 and the second slave area 624 may contact the interposer 630. Rear surfaces (e.g., surfaces that face the −Z direction) of the first slave area 622, the second slave area 624, and the third slave area 626 may face the rear plate (e.g., the rear plate 480 of FIG. 4). The first slave area 622, the second slave area 624, and the third slave area 626 may have the same size or different sizes. For example, the third slave area 626 may have a size that is smaller than that of at least one of the first slave area 622 and the second slave area 624.

The first slave area 622 may define the first interior space S1 as the first slave area 622 overlaps the first main area 612 while the interposer 630 is interposed therebetween. The second slave area 624 may define the second interior space S2 as the second slave area 624 overlaps the second main area 614 while the interposer 630 is interposed therebetween. The third slave area 626 may extend from the second slave area 624 toward at least any one of the first division area 681 and the first conductive area 691 disposed around a camera hole 677. The third slave area 626 may protrude further than the second main area 614, the interposer 630, and the second slave area 624, in a direction (e.g., the −X direction) that faces the first conductive area 691. The third slave area 626 may not overlap the second main area 614, the interposer 630, and the second slave area 624.

Figure 7A:
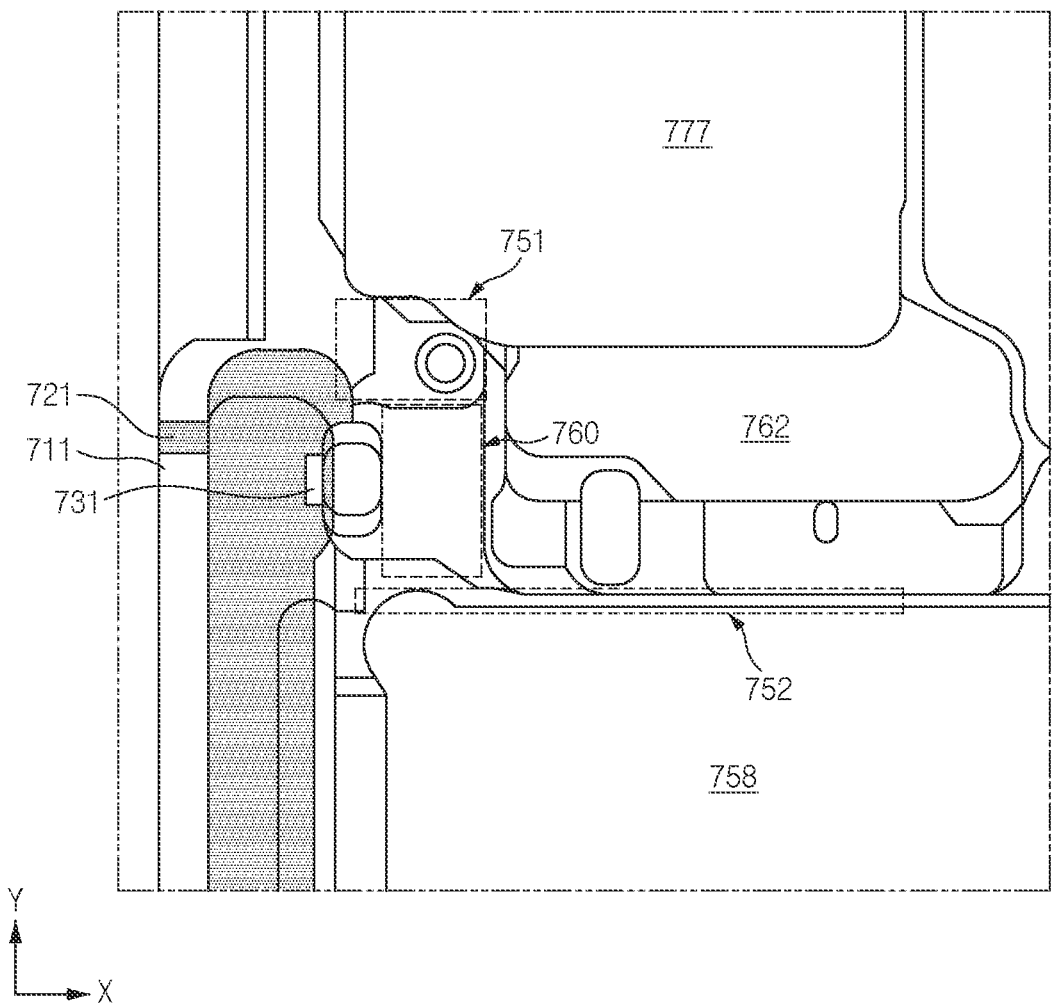
FIGS. 7A and 7B are views illustrating an electronic device before a first circuit board, a second circuit board, and an interposer are disposed, according to various embodiments of the disclosure.
Figure 7B:
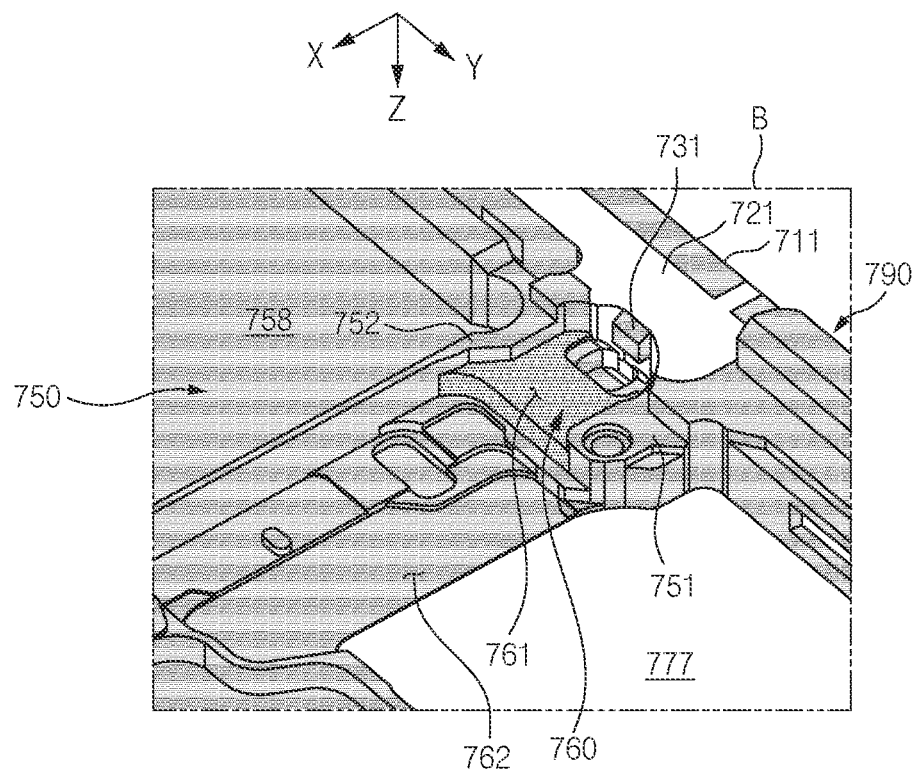

FIGS. 7A and 7B are views illustrating an electronic device before a first circuit board, a second circuit board, and an interposer are disposed, according to various embodiments of the disclosure.

Figure 7C:
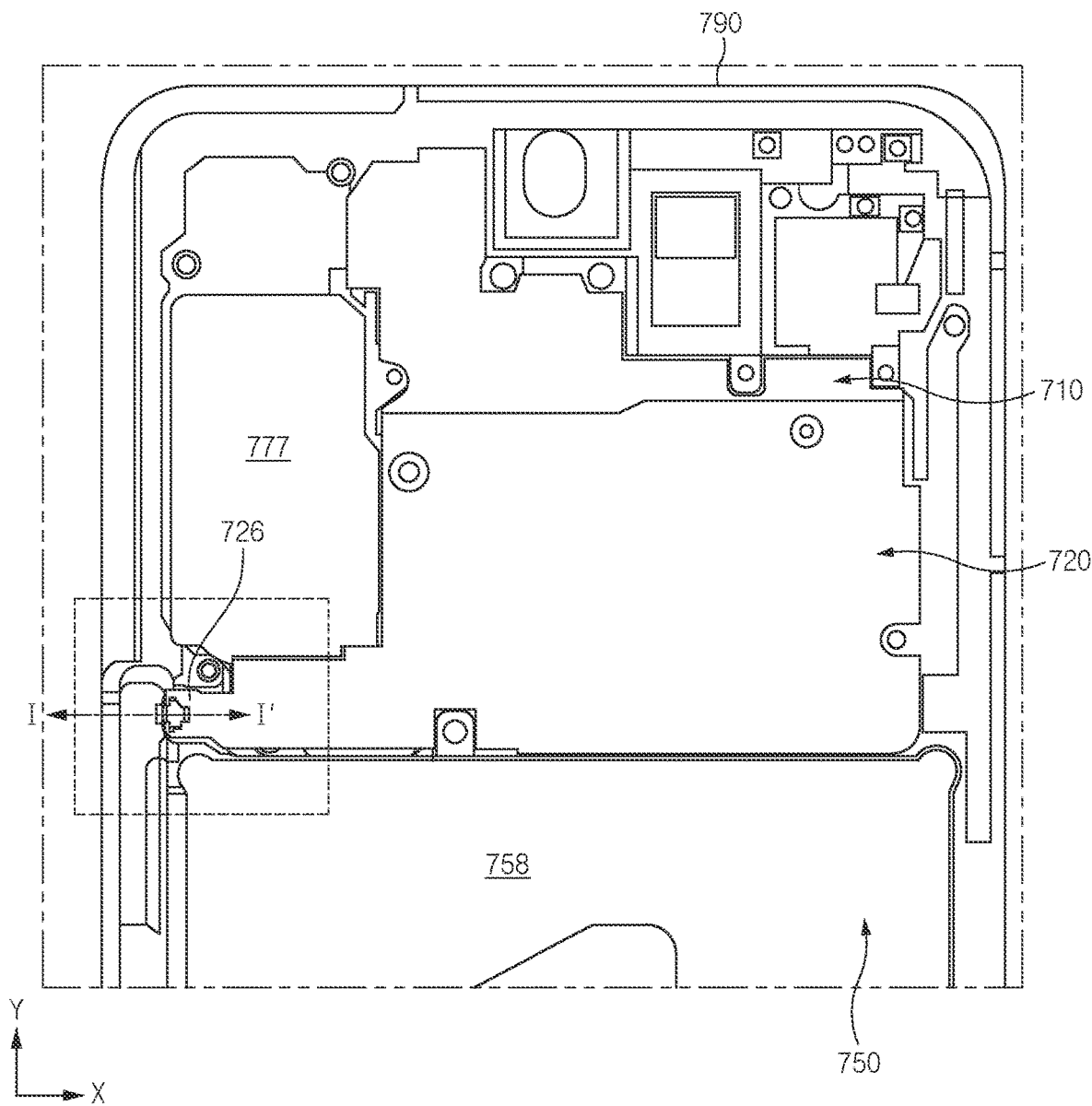
FIGS. 7C and 7D are views illustrating an electronic device after the first circuit board, the second circuit board, and the interposer are disposed, according to various embodiments of the disclosure.
Figure 7D:
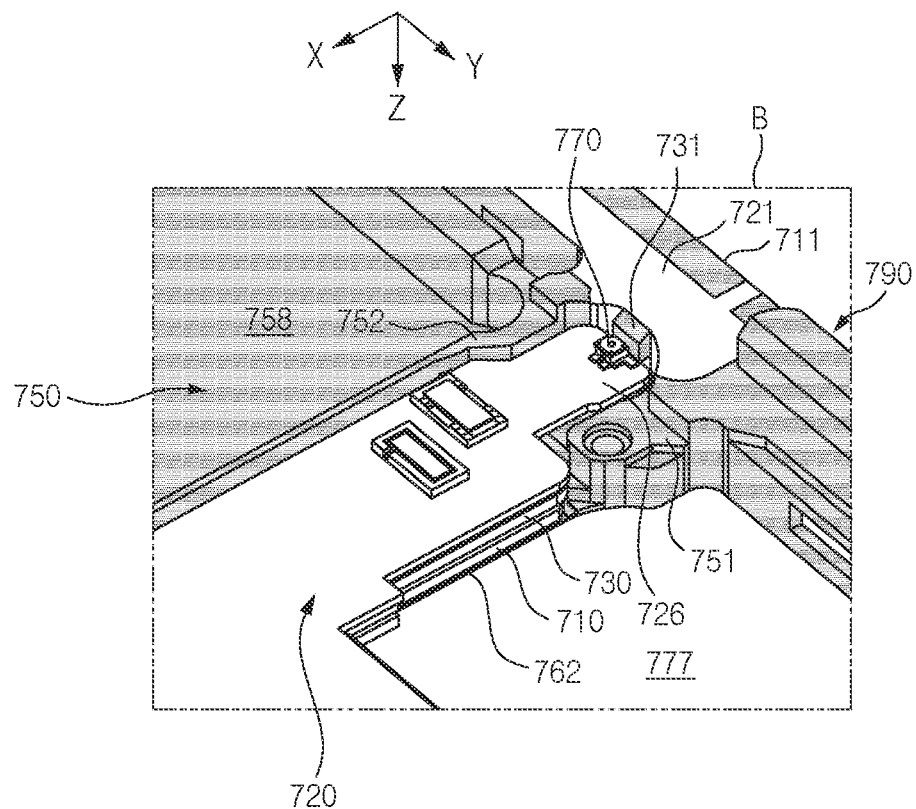

FIGS. 7C and 7D are views illustrating an electronic device after the first circuit board, the second circuit board, and the interposer 730 are disposed, according to various embodiments of the disclosure.

Referring to FIGS. 7A to 7D, a support member 750 of an electronic device according to an embodiment of the disclosure may include a first support area 751 and a second support area 752. The first support area 751 may be disposed around a camera hole 777, and the second support area 752 may be disposed to provide a second space 758 that receives the battery. The first support area 751 and the second support area 752 may be spaced apart from each other to be disposed to face each other.

The electronic device may include a reinforcement member 760 disposed between the first support area 751 and the second support area 752. The reinforcement member 760 may be formed of a conductive material.

The reinforcement member 760 may be coupled to the first support area 751 and the second support area 752 therebetween, and may be integrally formed with at least any one of the first support area 751 and the second support area 752.

At least any one of the first support area 751 and the second support area 752 and the reinforcement member 760 may be stepped. One surface (e.g., a surface that faces the −Z direction) of at least any one of the first support area 751 and the second support area 752 may be disposed to be higher than the one surface 761 of the reinforcement member 760. One surface of at least one of the first support area 751 and the second support area 752 may be disposed higher than the one surface 761 of the reinforcement member 760 by not less than a thickness of a third slave area 726 disposed on the one surface 761 of the reinforcement member 760. The one surface 761 of the reinforcement member 760 may be disposed to be higher than a seating surface 762 (e.g., a surface that faces the −Z direction) of the support member 750, on which a first circuit board 710 is seated.

The reinforcement member 760 may be disposed not to overlap a protruding area 731 of a first conductive area 711 (e.g., the first conductive area 691 of FIGS. 5 and 6) of a side member 790 (e.g., the side member 690 of FIGS. 5 and 6). The protruding area 731 may be included in the first conductive area 711. The protruding area 731 may extend from the first conductive area 711. The protruding area 731 may protrude further than a division area 721 of the side member 790 in a direction (e.g., the +X direction) that faces an interior of the housing. For example, the protruding area 731 may protrude toward the reinforcement member 760.

The protruding area 731 of the first conductive area 711 may be electrically connected to a wireless communication circuit disposed in at least any one of the first circuit board 710 and a second circuit board 720 through a connection member 770. The first conductive area 711 including the protruding area 731 may receive electric power from a wireless communication circuit disposed in at least any one of the first circuit board 710 and the second circuit board 720 through the connection member. The connection member 770 may be at least one conductive elastic body. For example, the connection member 770 may be formed of a clip or a pogo pin. The connection member 770 may be disposed at an edge of the second circuit board 720. The protruding area 731 of the first conductive area 711 may contact a contact terminal of the connection member 770.

The contact terminal of the connection member 770 may extend in a direction that is parallel to the second circuit board 720.

Figure 8:
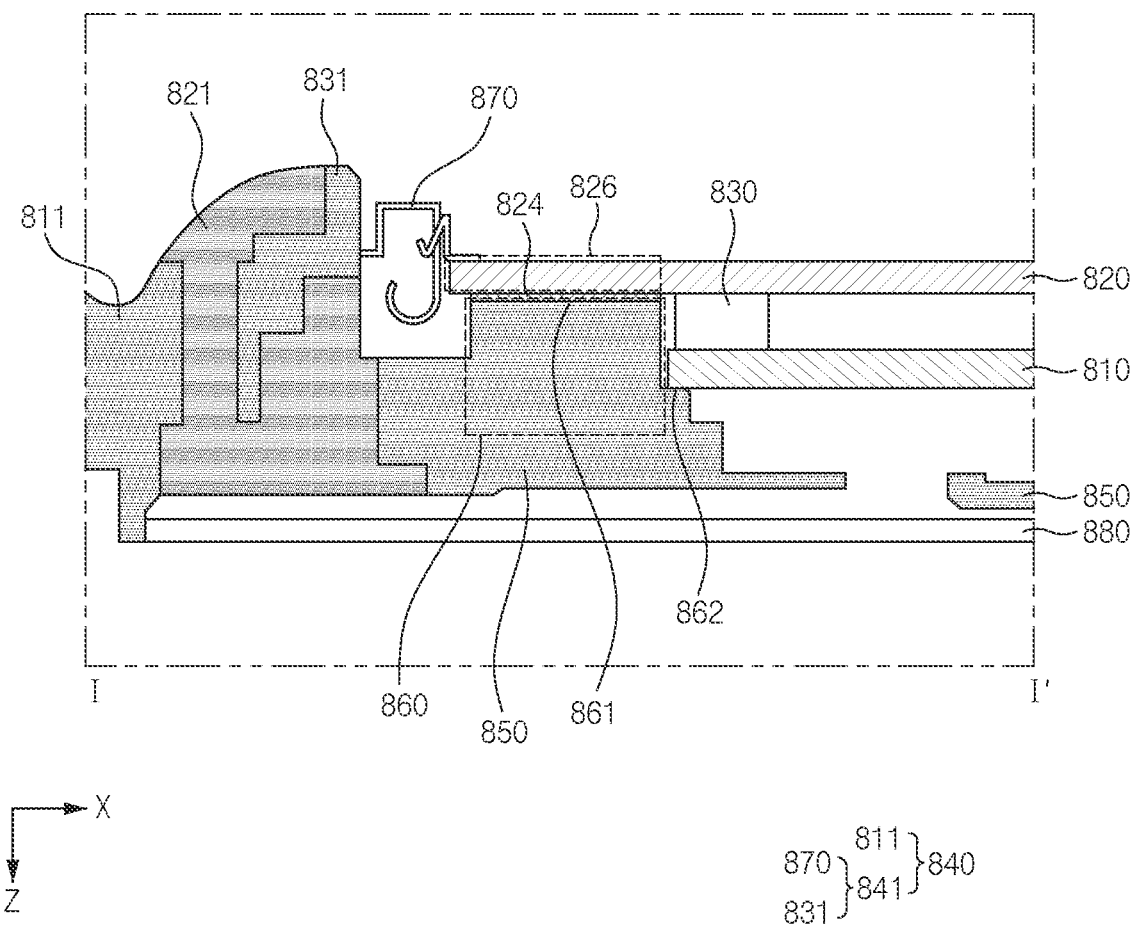
FIG. 8 is a cross-sectional view illustrating a disposition relationship between a second circuit board and a reinforcement member of an electronic device according to an embodiment of the disclosure.

FIG. 8 is a cross-sectional view of an electronic device according to an embodiment of the disclosure. FIG. 8 is a cross-sectional view illustrating an electronic device, taken along line I-I' in FIG. 7C.

Referring to FIG. 8, a first conductive area 811 of an electronic device 800 according to an embodiment of the disclosure may be included in a plurality of antennas to be used as an antenna radiator. For example, a first antenna 840 may include the first conductive area 811 and a first feeding part 841. The first feeding part 841 may include a protruding area 831 of the first conductive area 811 and a connection member 870.

The connection member 870 may be an electrical connection member having an elasticity in a form of a clip or a pogo pin. The connection member 870 may be disposed in a third slave area 826 of a second circuit board 820. The connection member 870 may be disposed between the protruding area 831, and the third slave area 826 of the second circuit board 820. The connection member 870 may be disposed at a portion of a corner of the third slave area 826 of the second circuit board 820. A contact terminal of the connection member 870 may protrude in a direction (e.g., the −X direction) that faces the protruding area 831. The connection member 870 may face a support member 850 that is adjacent to a reinforcement member 860, in a direction that faces a display 880.

The third slave area 826 of the second circuit board 820 may be disposed on one surface 861 (e.g., a surface that faces the −Z direction) of the support member 850 integrally formed with the support member 850. A first circuit board 810 electrically connected to the second circuit board 820 through an interposer 830 may be disposed on a seating surface 862 (e.g., a surface that faces the −Z direction) of the support member 850. The one surface 861 of the reinforcement member 860 may be disposed to be more distant from the display 880 than the seating surface 862 of the support member 850. One side surface (e.g., a surface that faces the +X direction) of the reinforcement member 860 may be disposed to face a side surface of the interposer 830, and an opposite side surface (e.g., a surface that faces the −X direction) of the reinforcement member 860 may be disposed to face at least any one of the connection member 870 and a division area 821.

An insulation member 824 may be disposed in at least a partial area of one surface (e.g., a surface that faces the +Z direction) of the third slave area 826 of the second circuit board 820 that faces the reinforcement member 860. For example, the insulation member 824 may be formed in an area of the one surface of the third slave area 826 of the second circuit board 820, which overlaps the reinforcement member 860. The insulation member 824 may prevent the reinforcement member 860 formed of a conductive material and one surface of the third slave area 826 of the second circuit board 820, which faces the reinforcement member 860, from being electrically short-circuited. Furthermore, the insulation member 824 may be disposed between the first circuit board 810 and the seating surface 862 of the support member 850.

Instead of including the insulation member 824, a portion of the third slave area 826 of the second circuit board 820, which faces the second reinforcement member 860, may be formed of a fill-cut area.

According to various embodiments of the disclosure, the third slave area 826 of the second circuit board 820 may extend further than the first circuit board 810 and the interposer 830, in a direction (e.g., the −X direction) that faces the protruding area 831. The first circuit board 810 and the interposer 830 may not extend further than the second circuit board 820 in a direction (e.g., the −X direction) that faces the protruding area 831. Because the first circuit board 810 does not extend further than the second circuit board 820, a space of the reinforcement member 860 that protrudes from the support member 850 toward the second circuit board 820 may be provided. In this case, the reinforcement member 860 is thicker than the support member 850 corresponding to the first circuit board 810, and thus a strength of the reinforcement member 860 may be secured. Accordingly, the reinforcement member 860 may support the second circuit board 820 and the connection member 870 without being broken.

Figure 9:
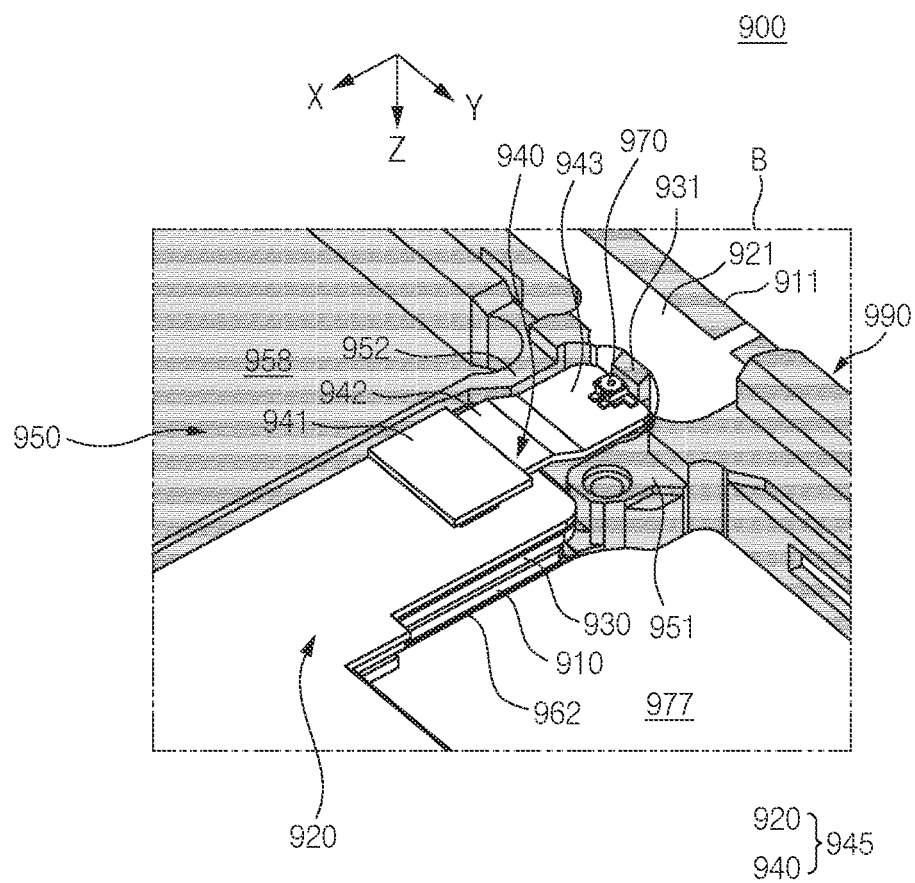
FIG. 9 is a perspective view illustrating a disposition relationship between a second circuit board of a multilayered structure and a reinforcement member of an electronic device according to an embodiment of the disclosure.
Figure 10:
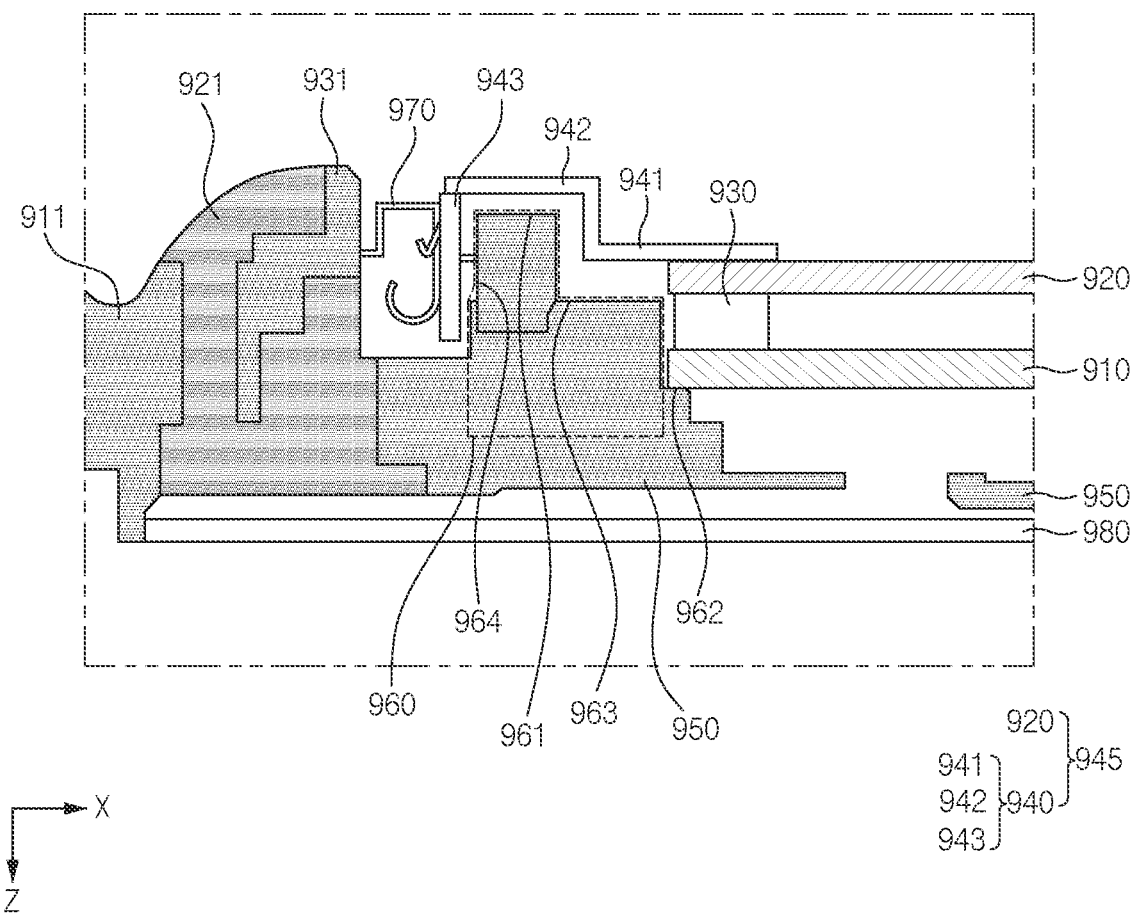
FIG. 10 is a cross-sectional view illustrating a disposition relationship between a second circuit board of a multilayered structure and a reinforcement member of an electronic device according to an embodiment of the disclosure.

FIGS. 9 and 10 are cross-sectional views of an electronic device according to various embodiments of the disclosure.

Referring to FIGS. 9 and 10, a support member 950 (e.g., the support member 750 of FIGS. 7A to 7D) of an electronic device 900 according to an embodiment of the disclosure may include a first support area 951 (e.g., the first support area 751 of FIGS. 7A to 7D), a reinforcement member 960, and a second circuit board 945.

The support member 950 may include the first support area 951 and a second support area 952 (e.g., the second support area 752 of FIGS. 7A to 7D). The first support area 951 may be disposed around a camera hole 977, and the second support area 952 may be disposed to provide a battery receiving space 958. The first support area 951 and the second support area 952 may be spaced apart from each other to be disposed to face each other.

The electronic device 900 may include the reinforcement member 960 disposed between the first support area 951 and the second support area 952. The reinforcement member 960 may be coupled to the first support area 951 and the second support area 952 therebetween, and may be integrally formed with at least any one of the first support area 951 and the second support area 952.

The second circuit board 945 may include a first partial circuit board 920 and a second partial circuit board 940. The first partial circuit board 920 may be electrically connected to a first circuit board 910 through an interposer 930. The first partial circuit board 920 and the first circuit board 910 may be formed of a printed circuit board (PCB). The second partial circuit board 940 may electrically connect the second circuit board 945 and the connection member 970. The second partial circuit board 940 may be formed of a flexible printed circuit board (FPCB).

The second partial circuit board 940 may be formed to be bent. The second partial circuit board 940 may include first to third board areas 941, 942, and 943. The first board area 941 may be electrically connected to the first partial circuit board 920. The first board area 941 may be disposed on the first partial circuit board 920, and a first surface 963 (e.g., a surface that faces the −Z direction) of the reinforcement member 960. The second board area 942 may extend from the first board area 941 in a direction (e.g., the −X direction) that faces a protruding area 931. The second board area 942 may be disposed on a second surface 961 disposed on a plane that is different from the first surface 963 of the reinforcement member 960. The first surface 963 may be disposed closer to a display 980 than the second surface 961. A seating surface 962, on which the first circuit board 910 is seated, may be disposed to be closer to the display 980 than the first surface 963 and the second surface 961.

According to an embodiment of the disclosure, the third board area 943 may be separated from the second board area 942 to be electrically connected to the second board area 942 through a conductive member. According to another embodiment, the third board area 943 may be integrally formed with the second board area 942 to extend from the second board area 942.

According to an embodiment of the disclosure, the third board area 943, as illustrated in FIG. 9, may extend from the second board area 942 in a direction (e.g., the −X direction) that faces the protruding area 931. The third board area 943 may be disposed on the first surface 963 of the reinforcement member 960. According to another embodiment, the third board area 943, as illustrated in FIG. 10, may extend from the second board area 942 in a direction (e.g., the +Z direction) that faces the display. The third board area 943 may face a side surface 964 of the reinforcement member 960. The third board area 943 may be disposed between the reinforcement member 960 and the protruding area 931.

The connection member 970 may be disposed on the third board area 943. The connection member 970 may be an electrical connection area having an elasticity in a form of a clip or a pogo pin. A contact terminal of the connection member 970 may protrude in a direction (e.g., the −X direction) that faces the protruding area 931. The connection member 970 may be included in the side member 990 (e.g., the side member 690 of FIGS. 5 and 6) and may be electrically connected to the protruding area 931 of a first conductive area 911 used as an antenna radiator. The first conductive area 911 may be electrically connected to a wireless communication circuit disposed in at least any one of the first circuit board 910 and the second circuit board 945 through the connection member 970. The wireless communication circuit may be electrically connected to the protruding area 931 of the first conductive area 911 through the connection member 970 to feed electric power. Accordingly, signals pertaining to various frequency band may be transmitted and/or received through the first conductive area 911 divided by a division area 921 (e.g., the first division area 681 of FIGS. 5 and 6).

The second partial circuit board 940 may extend further than at least any one of the first circuit board 910, the first partial circuit board 920, and the interposer 930, in a direction (e.g., the −X direction) that faces the first conductive area 911. The at least one of the first circuit board 910, the first partial circuit board 920, and the interposer 930 may not extend further than the second partial circuit board 940 in a direction (e.g., the −X direction) that faces the protruding area 931. Because the first circuit board 910, the first partial circuit board 920, and the interposer 930 do not extend further than the second partial circuit board 940, a space of the reinforcement member 960 that protrudes from the support member 950 toward the second partial circuit board 940 may be provided. In this case, the reinforcement member 960 is thicker than the support member 950 that faces the first circuit board 910, and thus a strength of the reinforcement member 860 may be secured. Accordingly, the reinforcement member 960 may support the second partial circuit board 940 and the connection member 970 without being broken.

For example, strengths of the electronic device of the comparative example, which does not include the reinforcement member, and the electronic device of the embodiment, which includes the reinforcement member, will be compared as shown in Table 1. As shown in Table 1, the strength of the electronic device, which includes the reinforcement member, is secured to be about two times or more higher than the strength of the electronic device of the comparative example, which does not include the reinforcement member.

TABLE 1

|  | Comparison example | Embodiment |
|---|---|---|
| Permanent deformation of support member | 17.6 | 31.9 |
| Cracks of division area | 15.0 | 35.6 |
| Set strength (front surface, kgf) | 20.0 | 47.5 |

Figure 11:
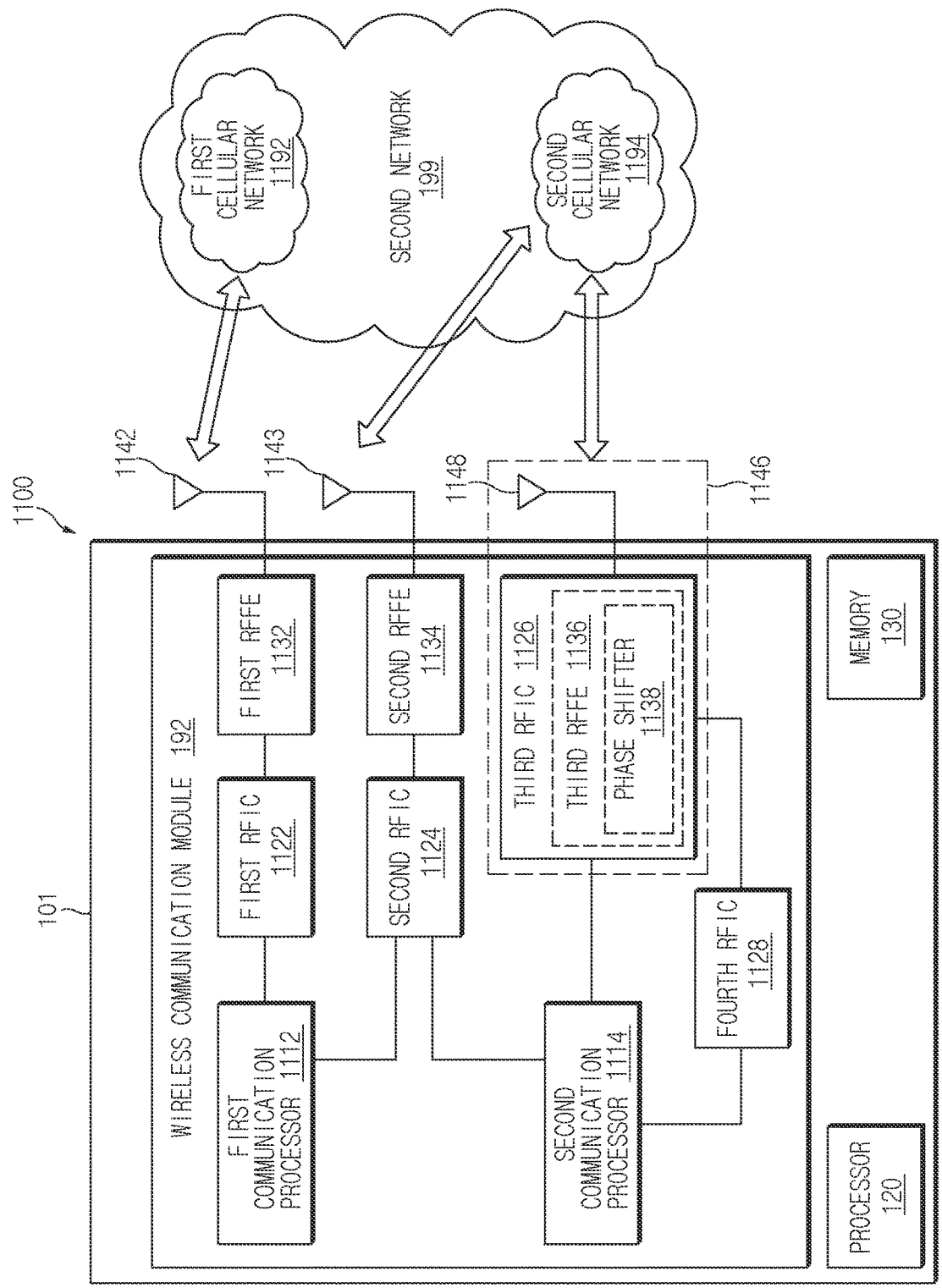
FIG. 11 is a block diagram of an electronic device for supporting a legacy network communication and a 5th generation (5G) network communication according to an embodiment of the disclosure.

FIG. 11 is a block diagram 1100 of an electronic device for supporting legacy network communication and 5G network communication, according to an embodiment of the disclosure.

Referring to FIG. 11, the electronic device 101 may include a first communication processor 1112, a second communication processor 1114, a first radio frequency integrated circuit (RFIC) 1122, a second RFIC 1124, a third RFIC 1126, a fourth RFIC 1128, a first radio frequency front end (RFFE) 1132, a second RFFE 1134, a first antenna module 1142, a second antenna module 1144, and an antenna 1148. The electronic device 101 may further include the processor 120 and the memory 130. The second network 199 may include a first cellular network 1192 and a second cellular network 1194. According to another embodiment, the electronic device 101 may further include at least one of the components described in FIG. 1, and the second network 199 may include at least one other network. According to an embodiment, the first communication processor 1112, the second communication processor 1114, the first RFIC 1122, the second RFIC 1124, the fourth RFIC 1128, the first RFFE 1132, and the second RFFE 1134 may form at least part of the wireless communication module 192. According to another embodiment, the fourth RFIC 1128 may be omitted or included as the part of the third RFIC 1126.

The first communication processor 1112 may support the establishment of a communication channel of a band to be used for wireless communication with the first cellular network 1192 and the legacy network communication through the established communication channel. The first cellular network 1192 may be a legacy network including 2nd generation (2G), 3rd generation (3G), 4$^{th}$ generation (4G), and/or long term evolution (LTE) network. The second communication processor 1114 may support the establishment of a communication channel corresponding to a specified band (e.g., about 6 GHz~about 60 GHz) among bands to be used for wireless communication with the second cellular network 1194 and 5G network communication via the established communication channel. The second cellular network 1194 may be 5G network defined in 3G partnership project (3GPP). Additionally, the first communication processor 1112 or the second communication processor 1114 may establish a communication channel for a specified band (e.g., about 6 GHz or lower) of the bands to be used for wireless communication with the second cellular network 1194 and may support 5G network communication through the established communication channel. The first communication processor 1112 and the second communication processor 1114 may be implemented within a single chip or a single package. The first communication processor 1112 or the second communication processor 1114 may be implemented within a single chip or a single package with the processor 120, the auxiliary processor 123 of FIG. 1, or the communication module 190.

At the time of transmission, the first RFIC 1122 may convert a baseband signal generated by the first communication processor 1112 to a radio frequency (RF) signal of about 700 MHz to about 3 GHz used for the first cellular network 1192 (e.g., a legacy network). At the time of reception, the RF signal may be obtained from the first cellular network 1192 (e.g., a legacy network) via an antenna (e.g., the first antenna module 1142) and may be preprocessed via RFFE (e.g., the first RFFE 1132). The first RFIC 1122 may convert the preprocessed RF signal to a baseband signal so as to be processed by the first communication processor 1112.

In the case of transmitting a signal, the second RFIC 1124 may convert a baseband signal generated by the first communication processor 1112 or the second communication processor 1114 into an RF signal (hereinafter referred to as a "5G Sub6 RF signal") in a Sub6 band (e.g., about 6 GHz or lower) used in the second cellular network 1194 (e.g., a 5G network). At the time of reception, the 5G Sub6 RF signal may be obtained from the second cellular network 1194 (e.g., 5G network) via an antenna (e.g., the second antenna module 1144) and may be preprocessed via RFFE (e.g., the second RFFE 1134). The second RFIC 1124 may convert the preprocessed 5G Sub6 RF signal to a baseband signal so as to be processed by a communication processor corresponding to some of the first communication processor 1112 or the second communication processor 1114.

At the time of transmission, the third RFIC 1126 may convert a baseband signal generated by the second communication processor 1114, to an RF signal (hereinafter referred to as a "5G Above6 RF signal") of a 5G Above6 band (e.g., about 6 GHz~about 60 GHz) to be used for the second cellular network 1194 (e.g., 5G network). At the time of reception, the 5G Above6 RF signal may be obtained from the second cellular network 1194 (e.g., 5G network) via an antenna (e.g., the module 1148) and may be preprocessed via the third RFFE 1136. For example, the third RFFE 1136 may perform preprocessing of a signal, using a phase shifter 1138. The third RFIC 1126 may convert the preprocessed 5G Above 6 RF signal to a baseband signal so as to be processed by the second communication processor 1114. According to an embodiment, the third RFFE 1136 may be formed as the part of the third RFIC 1126.

The electronic device 101 may include the fourth RFIC 1128 independent of the third RFIC 1126 or as at least part thereof. In this case, the fourth RFIC 1128 may convert the baseband signal generated by the second communication processor 1114, to an RF signal (hereinafter referred to as an intermediate frequency (IF) signal) of an intermediate frequency band (e.g., about 9 GHz~about 11 GHz) and then may transmit the IF signal to the third RFIC 1126. The third RFIC 1126 may convert the IF signal to the 5G Above6 RF signal. At the time of reception, the 5G Above6 RF signal may be received from the second cellular network 1194 (e.g., 5G network) via an antenna (e.g., the antenna 1148) and may be converted to the IF signal by the third RFIC 1126. The fourth RFIC 1128 may convert the IF signal to the baseband signal such that the second communication processor 1114 is capable of processing the baseband signal.

The first RFIC 1122 and the second RFIC 1124 may be implemented as at least part of a single chip or a single package. The first RFFE 1132 and the second RFFE 1134 may be implemented as at least part of a single chip or a single package. At least one antenna module of the first antenna module 1142 or the second antenna module 1144 may be omitted or may be coupled to another antenna module and then may process RF signals of a plurality of corresponding bands.

The third RFIC 1126 and the antenna 1148 may be disposed on the same substrate to form the third antenna module 1146. For example, the wireless communication module 192 or the processor 120 may be disposed on a first substrate (e.g., a main PCB). In this case, the third RFIC 1126 may be disposed in a partial region (e.g., a bottom surface) of a second substrate (e.g., sub PCB) separately of the first substrate; the antenna 1148 may be disposed in another partial region (e.g., an upper surface), and thus the third antenna module 1146 may be formed. The antenna 1148 may include an antenna array capable of being used for beamforming. It is possible to reduce the length of the transmission line between the third RFIC 1126 and the antenna 1148 by positioning the third RFIC 1126 and the antenna 1148 on the same substrate. The decrease in the transmission line may make it possible to reduce the loss (or attenuation) of a signal in a high-frequency band (e.g., approximately 6 GHz to approximately 60 GHz) used for the 5G network communication due to the transmission line. For this reason, the electronic device 101 may improve the quality or speed of communication with the second cellular network 1194 (e.g., 5G network).

The second cellular network 1194 (e.g., a 5G network) may be used independently of the first cellular network 1192 (e.g., a legacy network) (e.g., stand-alone (SA)) or may be used in conjunction with the first cellular network 1192 (e.g., non-stand alone (NSA)). For example, only an access network (e.g., a 5G radio access network (RAN) or a next generation RAN (NG RAN)) may be present in the 5G network, and a core network (e.g., a next generation core (NGC)) may be absent from the 5G network. In this case, the electronic device 101 may access the access network of the 5G network and may then access an external network (e.g., Internet) under control of the core network (e.g., an evolved packed core (EPC)) of the legacy network. Protocol information (e.g., LTE protocol information) for communication with the legacy network or protocol information (e.g., New Radio NR protocol information) for communication with the 5G network may be stored in the memory 130 so as to be accessed by another component (e.g., the processor 120, the first communication processor 1112, or the second communication processor 1114).

According to various embodiments of the disclosure, an electronic device may include a housing including a first plate that faces a first direction, a second plate that faces a second direction that is opposite to the first direction, and a side member that surrounds a space between the first plate and the second plate, a support member disposed in the space between the first plate and the second plate, a first conductive area included in the side member, a protruding area included in the first conductive area protruding from the first conductive area toward an interior of the housing, and electrically connected to the first conductive area, a first circuit board disposed on one surface of the support member, a reinforcement member protruding from the one surface of the support member toward the second direction, a second circuit board extending further than the first circuit board toward the protruding area, and disposed on the reinforcement member, and a connection member electrically connecting the protruding area and the second circuit board, and disposed on the second circuit board.

The reinforcement member may be integrally formed with the support member.

The first circuit board may not overlap the reinforcement member, and the second circuit board may overlap the reinforcement member.

The electronic device may further include an interposer disposed between the first circuit board and the second circuit board, and a side surface of the reinforcement member and a side surface of the interposer may face each other.

The second circuit board may include a first partial circuit board that faces the first circuit board, and a second partial circuit board that faces the reinforcement member.

The first circuit board and the first partial circuit board may not overlap the reinforcement member, and the second partial circuit board may overlap the reinforcement member.

The second partial circuit board may include a first board area contacting the first partial circuit board, a second board area extending from the first board area toward the protruding area, and a third board area connected to the second board area.

The connection member may be disposed on the third board area.

The third board area may extend from the second board area in the first direction.

The third board area may extend from the second board area toward the protruding area.

The first circuit board and the first partial circuit board may include a printed circuit board, and the second partial circuit board may include a flexible printed circuit board.

The connection area may include at least one of a C-clip or a pogo pin.

The support member may include a first support area disposed around the protruding area and a camera hole, and a second support area disposed around the protruding area and that provides a battery receiving space, and the reinforcement member may be disposed between the first support area and the second support area.

The electronic device may further include a wireless communication circuit disposed on at least any one of the first circuit board and the second circuit board, and the wireless communication circuit may be electrically connected to the protruding area through the connection member to feed electric power.

The electronic device may further include a camera bracket that is adjacent to the reinforcement member, and the side member may include a second conductive area integrally formed with the camera bracket, and a division area disposed between the first conductive area and the second conductive area.

According to various embodiments of the disclosure, an electronic device may include a housing including a first plate that faces a first direction, a second plate that faces a second direction that is opposite to the first direction, and a side member that surrounds a space between the first plate and the second plate, a support member disposed in the space between the first plate and the second plate, a first conductive area included in the side member, a first circuit board disposed on one surface of the support member, a reinforcement member integrally formed with the support member, and protruding further than one surface of the support member toward the second direction, and a second circuit board extending further than the first circuit board toward the first conductive area, and disposed on the reinforcement member.

The electronic device may further include an interposer disposed between the first circuit board and the second circuit board, and a side surface of the reinforcement member and a side surface of the interposer may face each other.

The second circuit board may include a first partial circuit board that faces the first circuit board, and a second partial circuit board that faces the reinforcement member, the first circuit board and the first partial circuit board may not overlap the reinforcement member, and the second partial circuit board may overlap the reinforcement member.

The first circuit board and the first partial circuit board may include a printed circuit board, and the second partial circuit board may include a flexible printed circuit board.

The electronic device may further include a connection member electrically connecting the first conductive area and the second circuit board, and disposed on the second circuit board, and the connection member may include at least one of a C-clip or a pogo pin.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
   a housing including:
      a first plate facing a first direction,
      a second plate facing a second direction opposite to the first direction, and
      a side member surrounding a space between the first plate and the second plate;
   a support member disposed in the space between the first plate and the second plate;
   a first conductive area included in the side member;
   a protruding area included in the first conductive area, protruding from the first conductive area toward an interior of the housing, and electrically connected to the first conductive area;

a first circuit board disposed on one surface of the support member;
a reinforcement member protruding from the one surface of the support member in the second direction;
an interposer disposed adjacent to the reinforcement member;
a second circuit board extending further than the first circuit board toward the protruding area, and disposed on the reinforcement member; and
a connection member electrically connecting the protruding area and the second circuit board, and disposed on the second circuit board.

2. The electronic device of claim 1, wherein the reinforcement member is integrally formed with the support member.

3. The electronic device of claim 2,
wherein the first circuit board does not overlap the reinforcement member, and
wherein the second circuit board overlaps the reinforcement member.

4. The electronic device of claim 1,
wherein the interposer is further disposed between the first circuit board and the second circuit board,
wherein a side surface of the reinforcement member and a side surface of the interposer face each other.

5. The electronic device of claim 1, wherein the second circuit board includes:
a first partial circuit board facing the first circuit board; and
a second partial circuit board facing the reinforcement member.

6. The electronic device of claim 5,
wherein the first circuit board and the first partial circuit board do not overlap the reinforcement member, and
wherein the second partial circuit board overlaps the reinforcement member.

7. The electronic device of claim 5, wherein the second partial circuit board includes:
a first board area contacting the first partial circuit board;
a second board area extending from the first board area toward the protruding area; and
a third board area connected to the second board area.

8. The electronic device of claim 7, wherein the connection member is disposed on the third board area.

9. The electronic device of claim 7, wherein the third board area extends from the second board area in the first direction.

10. The electronic device of claim 7, wherein the third board area extends from the second board area toward the protruding area.

11. The electronic device of claim 5,
wherein the first circuit board and the first partial circuit board include a printed circuit board, and
wherein the second partial circuit board includes a flexible printed circuit board.

12. The electronic device of claim 1, wherein the connection member includes at least one of a C-clip or a pogo pin.

13. The electronic device of claim 1,
wherein the support member includes:
a first support area disposed around the protruding area and a camera hole; and
a second support area disposed around the protruding area and configured to provide a battery receiving space, and
wherein the reinforcement member is disposed between the first support area and the second support area.

14. The electronic device of claim 1, further comprising:
a wireless communication circuit disposed on at least one of the first circuit board and the second circuit board,
wherein the wireless communication circuit is electrically connected to the protruding area through the connection member to feed electric power.

15. The electronic device of claim 1, further comprising:
a camera bracket disposed adjacent to the reinforcement member,
wherein the side member includes:
a second conductive area integrally formed with the camera bracket; and
a division area disposed between the first conductive area and the second conductive area.

16. An electronic device comprising:
a housing including:
a first plate facing a first direction,
a second plate facing a second direction opposite to the first direction, and
a side member surrounding a space between the first plate and the second plate;
a support member disposed in the space between the first plate and the second plate;
a first conductive area included in the side member;
a first circuit board disposed on one surface of the support member;
a reinforcement member integrally formed with the support member, and protruding further than the one surface of the support member in the second direction;
an interposer disposed adjacent to the reinforcement member;
a second circuit board extending further than the first circuit board toward the first conductive area, and disposed on the reinforcement member; and
a connection member comprising an elastic body electrically connecting the first conductive area and the second circuit board and being disposed on an edge of the second circuit board,
wherein the first circuit board and a portion of the second circuit board do not overlap a top surface of the reinforcement member,
wherein the connection member electrically connects the second circuit board to a protruding area included in the first conductive area, and
wherein the protruding area protrudes from the first conductive area toward an interior of the housing.

17. The electronic device of claim 16, further comprising:
wherein the interposer is further disposed between the first circuit board and the second circuit board,
wherein a side surface of the reinforcement member and a side surface of the interposer face each other.

18. The electronic device of claim 16,
wherein the second circuit board includes:
a first partial circuit board facing the first circuit board; and
a second partial circuit board facing the reinforcement member,
wherein the first circuit board and the first partial circuit board do not overlap the reinforcement member, and
wherein the second partial circuit board overlaps the reinforcement member.

19. The electronic device of claim 18,
wherein the first circuit board and the first partial circuit board include a printed circuit board, and
wherein the second partial circuit board includes a flexible printed circuit board.

20. The electronic device of claim 16, wherein the connection member includes at least one of a C-clip or a pogo pin.

21. The electronic device of claim 16, wherein the reinforcement member and the support member are arranged outside an area between the first circuit board and the second circuit board.

* * * * *